United States Patent [19]

Kondo et al.

[11] Patent Number: 4,687,615

[45] Date of Patent: Aug. 18, 1987

[54] METHOD OF PRODUCING BIAXIALLY ORIENTED TUBULAR POLYETHERETHERKETONE FILMS

[75] Inventors: Kazuo Kondo, Marugame; Satoshi Maruyama, Nakatado, both of Japan

[73] Assignee: Okura Industrial Co., Ltd., Marugame, Japan

[21] Appl. No.: 776,545

[22] Filed: Sep. 16, 1985

[51] Int. Cl.$^4$ .............................................. B29C 47/88

[52] U.S. Cl. .................... 264/557; 264/564; 264/567; 264/289.3; 264/290.2; 264/331.21

[58] Field of Search ............ 264/567, 564, 210.5, 264/289.3, 290.2, 560, 562, 557, 331.21; 425/71

[56] References Cited

U.S. PATENT DOCUMENTS

| | | | |
|---|---|---|---|
| 3,142,092 | 7/1964 | Ralston | 264/209.5 |
| 3,278,663 | 10/1966 | Graham | 264/209.5 |
| 3,671,617 | 6/1972 | Nagase | 425/326.1 |
| 3,857,917 | 12/1974 | Reade | 264/562 |
| 4,120,931 | 10/1978 | Fukushima et al. | 264/280 |
| 4,435,350 | 3/1984 | Fukushima et al. | 264/331.21 |
| 4,451,306 | 5/1984 | Verne | 264/210.1 |

FOREIGN PATENT DOCUMENTS 2145652A  4/1985  United Kingdom ............. 264/209.5

*Primary Examiner*—Jeffery Thurlow
*Attorney, Agent, or Firm*—Millen & White

[57] ABSTRACT

A method of producing biaxially oriented tubular polyetheretherketone films having good optical and mechanical properties and heat resistance, by rapidly quenching at a rate of at least 24° C. per second an unoriented tubular polyetheretherketone film as melt-extruded through a circular die thereby imparting a crystallinity of not greater than 10% to the film, and continuously introducing the thus produced film into the space between a feed nip roll pair and a pull nip roll pair while reheating the film externally to a temperature of 60°–140° C. and allowing the film to expand under the influence of the internal pressure to an areal draw ratio of 4–36, to thereby attain biaxial orientation.

11 Claims, No Drawings

METHOD OF PRODUCING BIAXIALLY ORIENTED TUBULAR POLYETHERETHERKETONE FILMS

BACKGROUND OF THE INVENTION

1. Title of the Invention

This invention relates to a method of producing biaxially oriented tubular polyetheretherketone films.

2. Description of the Prior Art

In recent years, the range of use of plastics films has been increasing and, at present, high-level performance characteristics are required of plastics films. Among others, heat resistance is required, particularly when they are used as spacecraft or aircraft materials or high-grade electric insulator materials. It is not going too far to say that, for the present, polyimide films are the only films that can meet such requirements. However, since polyimide films are produced by the solution casting method, commercial production of said films is in a very unfavorable competitive position in that large-scale production equipment is required, the production process is complicated, productivity is very low and, as a result, the cost of film production is high.

Under these circumstances, the present inventors attempted to provide a method of producing polyetheretherketone films having heat resistance, good optical properties and good and balanced lengthwise and breadthwise mechanical properties at low cost and in a highly efficient manner by the extrusion method (simultaneous biaxial drawing in the tubular form).

It is well known that when biaxially oriented, thermoplastic resin films generally acquire improved mechanical and optical properties and improved heat resistance. For the purpose of biaxial orientation, there are known the tenter frame process and the tubular process. In the tenter frame process, the successive drawing technique is generally employed which comprises heating an unoriented flat film to an appropriate drawing temperature and then drawing it in the longitudinal direction making use of rolls and then in the breadthwise direction making use of chucks. Complicated and large-scaled equipment is required and chucking directly means a loss of film (chucked portions are sacrificed). As a result, the efficiency of film production is low and the product films unavoidably exhibit directional differences in physical properties. On the other hand, the tubular process comprises introducing an unoriented film into the space between a feed roll pair and a pull roll pair, reheating the film externally to a temperature appropriate for drawing and allowing the film or bubble to expand and be stretched by means of the internal pressure. The equipment required is simple and small-sized. Film loss such as caused by chucking in the tenter frame process is not incurred at all. The process is thus characterized by very good productivity and product films have balanced lengthwise and breadthwise mechanical properties.

The polyetheretherketone resin is a crystalline resin. When crystallization progresses and crystallinity becomes excessively high, it becomes hard and brittle and, further, grey and opaque. In unoriented film form, it cannot be used in the practice and its mechanical properties cannot be improved by drawing. Therefore, it is necessary to improve polyetheretherketone films which respect to their mechanical properties such as film strength and optical characteristics by keeping their crystallinity at a low level and subjecting them to biaxial orientation. However, the mode of practice of the tubular process which is in general use, in which cooling of molten resin as it is extruded through a circular die is effected by means of a gaseous medium such as air, gives hard and brittle films, which are broken when submitted to feed rolls. Such films thus cannot undergo the subsequent drawing. It can safely be said that there is no precedent for the production of biaxially oriented polyetheretherketone films by the tubular process on a commercial scale.

It was the technical task given to the present inventors in such circumstances to make it possible to obtain polyetheretherketone films having high heat resistance, good optical properties and high and directionally balanced strength by simultaneous biaxial orientation by the tubular process which uses a relatively small equipment as compared with the tenter frame process and gives good operation efficiency and productivity. The inventors conducted intensive investigations in search of such conditions as to enable such tubular-form simultaneous biaxial orientation with the polyetheretherketone resin and, as a result, they found the method of the present invention.

Accordingly, it is an object of the invention to provide a method of producing polyetheretherketone films biaxially oriented by the tubular process.

SUMMARY OF THE INVENTION

In one aspect, this invention relates to a method of producing biaxially oriented polyetheretherketone films having good mechanical and optical properties, which comprises biaxially drawing an unoriented film of the polyetheretherketone having a crystallinity of not greater than 10% at a temperature of 60°-140° C., to an areal draw ratio of 4 to 36.

In another aspect, this invention relates to a method of converting a polyetheretherketone resin into an unoriented tubular film which can be biaxially oriented into a film having good mechanical and optical properties, which comprises rapidly quenching a melt-extruded tubular film of the resin as it is extruded at a rate of at least 24° C. per second, to form an unoriented tubular film having a crystallinity of not more than 10%.

In a further aspect, this invention relates to a continuous method of producing biaxially oriented tubular polyetheretherketone films having good optical and mechanical properties and heat resistance, by rapidly quenching at a rate of at least 24° C. per second an unoriented tubular polyethereetherketone film as melt-extruded through a circular die thereby imparting a crystallinity of less than 10% to the film, and continuously introducing the thus produced film into the space between a feed nip roll pair and a pull nip roll pair while reheating the film externally and allowing the film to an areal draw ratio of 4–36, to expand under the influence of the internal pressure to thereby attain biaxial orientation.

DETAILED DESCRIPTION OF THE INVENTION

The crystallinity of a crystalline film varies significantly depending on the rate of cooling following melt extrusion and it is known that a higher cooling rate affords a lower crystallinity. In the case of polyetheretherketone films, it is one of their characteristic features that they become grey and opaque and hard and brittle with the progress of crystallization and, in the tubular process, drawing is generally effected, as mentioned above, by reheating the tubular film between a feed roll pair and a pull roll pair and allowing the film to expand under the action of the internal pressure, so that crystallization takes place to a significant extent. The film, now hard and brittle, is broken upon entering the nip of the feed roll pair, and subsequent drawing is impossible.

With polyetheretherketone resin, the relationship between the rate of cooling, on one hand, and the crystallinity of films obtained, the drawability of films, or the appearance of films obtained, on the other, was investigated. The results obtained are shown in Table 1. The crystallinity data given herein were calculated in the rule of three based on the density data obtained by the density gradient tube method. The amorphous portion of polyetheretherketone has a specific gravity of 1.265 and the crystalline portion has a specific gravity of 1.320. The density gradient tube was constructed using liquid paraffin and carbon tetrachloride and the density measurement was performed at 25° C.

TABLE 1

| Rate of cooling °C./sec | Crystallinity % | Drawability | Appearance |
| --- | --- | --- | --- |
| 50 | 0 | ⊚ | ⊚ |
| 30 | 6 | ○ | ○ |
| 24 | 10 | ○ | ○ |
| 18 | 47 | X | X |

⊚ Very good
○ Good
X Not good

The data given in Table 1 indicate that the films which have a crystallinity of not more than 10% can undergo simultaneous biaxial (lengthwise and breadthwise) orientation when they are cooled at a rate of at least 24° C. per second and that the films thus obtained have good optical properties and good, balanced lengthwise and breadthwise mechanical properties. Especially when the crystallinity is 6% or less, the films obtained have very good optical properties (light transmission, specular gloss, etc.). When crystallinity exceeds 10%, the films become hard and can not be drawn in a stable manner.

Various techniques were investigated in order to realize such low crystallinity. As a result, it was found that the conventional air cooling technique which uses a gaseous cooling medium can hardly provide polyetheretherketone films extruded by circular die with the requisite crystallinity. Therefore, in the practice of the present invention, it is desirable to employ, for cooling films rapidly, a cooling technique that uses a liquid coolant such as water or a combination of such cooling technique with the air cooling technique.

The drawing temperature is one of the important constituents of the invention. Generally, a higher crystallinity requires the drawing temperature to be higher. However, it was found that if the crystallinity is kept at a low level in accordance with the invention by an appropriate measure, for example by cooling at a rate of at least 24° C. per second by means of a liquid cooling medium such as water, simultaneous biaxial orientation is possible at very low temperatures. A temperature within the range of 60°–140° C., preferably 80°–120° C., is optimum as the drawing temperature for enabling simultaneous biaxial orientation in accordance with the invention. At a temperature below 60° C., films are readily broken during drawing whereas, at a temperature exceeding 140° C., crystallization proceeds in unoriented films during drawing and results in deteriorated optical properties of the films. Within the drawing temperature range of 80°–120° C., films can be drawn in a very steady manner and acquire very good optical properties, including light transmissivity and specular gloss.

As for the draw ratio, another constituent factor of the invention, the areal draw ratio (lengthwise draw ratio x breadthwise draw ratio) is suitably 4 to 36. Especially within the areal draw ratio range of 9 to 25, bubble production can be effected stably and films obtained have good uniformity and precision in thickness. When the process is practiced at an areal draw ratio of less than 4, uneven drawing results and the films obtained are not uniform in thickness. At an areal draw ratio of more than 36, bubble breakage often occurs during drawing and stable film production cannot be realized.

The effects of the invention are now described. The films produced in accordance with the invention show a high continuous enduring temperature (in an experiment, as high as 220° C.) when tested in accordance with the relevant UL specification. Said temperature is almost comparable to the enduring temperature of polyimide films, namely 230° C. The films produced in accordance with the invention have good transparency and specular gloss and, since they are biaxially oriented in the lengthwise and breadthwise directions simultaneously, they have good, balanced lengthwise and breadthwise strength characteristics. In Table 2, a biaxially oriented polyetheretherketone film produced in accordance with the invention and a polyimide film are compared with respect to several physical properties.

TABLE 2

| Physical properties | Tensile strength kg/cm² | | Elongation % | | Light transmissivity % | Haze value % | Specular gloss % | Water absorption Wt % |
| --- | --- | --- | --- | --- | --- | --- | --- | --- |
| Film | Lengthwise | Breadthwise | Lengthwise | Breadthwise | | | | (23° C., 24 h) |
| Biaxially oriented polyetheretherketone film | 2936 | 3114 | 57 | 60 | 86.3 | 0.6 | 210 | 0.14 |
| Polyimide film | 2311 | 1959 | 64 | 80 | 74.5 | 2.0 | 179 | 2.9 |

The polyimide film shown in Table 2 absorbs moisture to a certain extent, so that the physical properties of the polyimide film are deteriorated in a high-temperature, high-humidity atmosphere. On the contrary, the film produced by the method of the invention has an additional advantage that it is not affected by high temperature and high humidity.

Thanks to the characteristics mentioned hereinabove, the films obtained by the production method according to the invention can be used in the fields of heat-durable insulating tapes, inside linings for microwave ovens, condensers, liquid crystal display devices and heat-durable flexible printed-circuit substrates, among others.

By making use of their heat-shrinkable property, said films can also be used in shrink packaging of metal tubes or pipes and other parts which are used in high-temperature, high-humidity conditions or exposed to radiation such as gamma rays or to chemicals.

In the practice of the invention, antiblocking agents, lubricants, heat stabilizers, ultraviolet absorbers and other additives may be used for improving some or other properties of the films unless such additives significantly impair the mechanical and optical properties of the films.

The following examples illustrate the invention in more detail. However, they are by no means limitative of the scope of the invention.

EXAMPLE 1

A polyetheretherketone resin [product of IMPERIAL CHEMICAL INDUSTRIES PLC. (hereinafter referred to ICI for short)] was extruded through a circular die (50 $\phi$) at a melt temperature of 400° C. The extrudate was directly quenched at a rate of cooling of 35° C. per second by means of a cooling apparatus using water at 10° C. to give an unoriented tubular film having a crystallinity of 3%, a breadth of 82 mm and a thickness of 135$\mu$. This unoriented film was led to a feed roll pair and then heated to a temperature of 100° C. by means of a cylindrical heating device an Infrastein heater. Air was introduced into the tube to thereby cause drawing of the film at a lengthwise draw ratio of 3 and a breadthwise draw ratio of 3, hence at an areal draw ratio of 9. The film was allowed to pass through the nip of a pull roll pair and wound on a windup roll. The film obtained had a thickness of 15$\mu$ and a breadth of 246 mm, with good transparency and specular gloss. The film had improved mechanical properties and was balanced with respect to lengthwise strength and breadthwise strength. The film could be produced in a stable manner.

EXAMPLE 2

A polyetherether ketone resin (ICI) was extruded through a circular die (50 $\phi$) at a melt temperature of 400°C. and, immediately thereafter, quenched at a cooling rate of 24° C. per second by means of a cooling apparatus using water at 10° C. to give an unoriented tubular film having a crystallinity of 10%, a breadth of 82 mm and a thickness of 160$\mu$. This unoriented film was led to a feed roll pair and then heated to a temperature of 120° C. by means of a cylindrical heating device disposed following said roll pair and using an Infrastein heater. Thereafter, air was introduced into the tube to thereby cause expansion of the film at a lengthwise draw ratio of 4 and a breadthwise draw ratio of 4, hence at an areal draw ratio of 16, and wound up on a windup roll. The film obtained had a thickness of 10$\mu$ and a breadth of 328 mm. The film production could be performed stably and the product film was balanced with respect to lengthwise and breadthwise mechanical properties and had good optical properties.

COMPARATIVE EXAMPLE 1

A polyetheretherketone resin (ICI) was extruded through a circular die (50 $\phi$) at a melt temperature of 400° C. and cooled at a rate of 18° C. per second by means of a water cooling device to give an unoriented film having a crystallinity of 47%, a breadth of 82 mm and a thickness of 150$\mu$. This unoriented film was led to a feed roll pair and heated to one of various temperatures by means of a heating device provided following said roll pair and using an Infrastein heater. Thereafter, air was introduced into the tube in an attempt to effect drawing (orientation). However, the bubble could not be expanded at any temperature, hence film production was impossible.

What is claimed is:

1. A method of producing biaxially oriented tubular polyetheretherketone films having good optical and mechanical properties and heat resistance, comprising rapidly quenching at a rate of at least 24° C. per second, an unoriented tubular polyetheretherketone film as melt-extruded through a circular die, thereby imparting a crystallinity of not greater than 10% to the film, and continuously introducing the thus-produced film into the space between a feed nip roll pair and a pull nip roll pair while reheating the film externally to a temperature of 60°–140° C. and introducing air into the hollow interior of said tubular film to allow the film to expand under the influence of the internal pressure thus created to an areal draw ratio of 4–36, to thereby attain biaxial orientation.

2. A method as claimed in claim 1, wherein the unoriented film is rapidly cooled by means of a liquid or a combination of a liquid and air.

3. A method as claimed in claim 2, wherein the liquid is water.

4. A method as claimed in claim 1, wherein the film is reheated to a temperature of 80°–120° C.

5. A method as claimed in claim 1, wherein the film is expanded to an areal draw ratio of 9–25.

6. A method according to claim 1, wherein the extruded film is cooled at a rate of at least 30° C. per second and an unoriented film having a crystallinity of not greater than 6% is produced.

7. A method according to claim 6 wherein the film is reheated to a temperature of 80°–120° C. and wherein the film is expanded to an areal draw ratio of 9–25.

8. A method of producing biaxially oriented polyetheretherketone films having good mechanical and optical properties, which comprises biaxially drawing an unoriented tubular film of the polyetheretherketone having a crystallinity of not greater than 10% at a temperature of 60°–140° C. to an areal draw ratio of 4 to 36.

9. A method according to claim 8, wherein the film is reheated to a temperature of 80°–120° C.

10. A method according to claim 8, wherein the film is drawn to an areal draw ratio of 9–25.

11. A method according to claim 8, wherein the unoriented film has a crystallinity of not greater than 6%.

* * * * *